United States Patent [19]

Huggins et al.

[11] 4,354,340
[45] Oct. 19, 1982

[54] MECHANICAL PRUNING DEVICE

[76] Inventors: Edgar M. Huggins, P.O. Box 527, Kingstree, S.C. 29556; Thomas M. Brandon, 321 Azelia Dr., Conway, S.C. 29526

[21] Appl. No.: 191,308

[22] Filed: Sep. 26, 1980

[51] Int. Cl.³ .......................................... A01D 45/16
[52] U.S. Cl. .................................................... 56/27.5
[58] Field of Search ....................... 56/27.5, 14.9, 15.2

[56] References Cited

U.S. PATENT DOCUMENTS

| | | | |
|---|---|---|---|
| 1,913,034 | 6/1933 | Lindgren et al. | 56/14.9 |
| 3,601,959 | 8/1971 | Pinkham | 56/27.5 |
| 3,841,071 | 10/1974 | Pinkham et al. | 56/27.5 |
| 4,192,124 | 3/1980 | Balthes | 56/27.5 |
| 4,212,145 | 7/1980 | Middleton | 56/27.5 |

*Primary Examiner*—Robert A. Hafer
*Attorney, Agent, or Firm*—Harvey B. Jacobson

[57] ABSTRACT

An apparatus for attachment to the PTO of a tractor or other tow vehicle. The apparatus includes a framework mounting a laterally extending tool bar, the height of which is determined by adjustment of a pair of supporting gauge wheels. The tool bar mounts a plurality of depending pruning heads adapted to remove the lower leaves from a tobacco stalk. Each pruning head contains a pair of laterally spaced rotatable paddles which are mounted for passage adjacent opposite sides of the lower portion of a tobacco stalk for engagement with and removal of the leaves. The paddles are rotated by a series of belt and chain drives which are mounted on the tool bar and connect the paddles to the PTO.

17 Claims, 10 Drawing Figures

MECHANICAL PRUNING DEVICE

BACKGROUND OF THE INVENTION

1. Field of the Invention

This invention relates to defoliating apparatus and especially to such apparatus to remove the lower leaves from tobacco plants in order to improve crop yield.

2. Discussion of Related Art

A tobacco plant contains upper leaves which have industrial value. Plants also contain lugs which normally constitute the bottom four leaves of the plant. These lugs have no price support and are not generally used commercially. It is known that these unwanted and unsupported lugs reduce the tobacco plant's ability to grow desirable upper leaves and thus reduce crop yield per acre. Tests have shown that tobacco plants delugged at topping have a greatly increased value over tobacco with the lugs harvested and an even greater return per acre over tobacco with the lugs left unharvested. Accordingly, it is highly desirable to effect removal of these lugs quickly and inexpensively.

Various devices have been suggested for defoliating certain areas of growing crops. For instance, U.S. Pat. No. 3,570,228, issued Mar. 16, 1971 to Phillips, shows a deleafer for Brussels sprout plants and the like, which comprises a transverse frame disposed to a height to clear a row of plants. A pair of arms, one longer than the other, extend rearwardly from the frame and are adapted to swing on substantially vertical axes. A vertical axis cutting assembly is rotatably mounted on the end of each arm and has tangentially disposed knives of a length commensurate with the height of the plants. The knives are rotated reversely with respect to each other. U.S. Pat. No. 3,601,959, issued Aug. 31, 1971 to Pinkham, shows an apparatus for defoliating vertically limited sections of tobacco plants. The apparatus comprises a pair of flexible, rotating webs having scalloped twisted edges. The webs are mounted in a framework and drawn along the lower portion of a tobacco plant for removing leaves located thereon. U.S. Pat. No. 3,892,061, issued July 1, 1975 to Whitley, shows a defoliator mechanism for removing leaves from a portion of the stalk of a row of plants. The mechanism comprises a support which is movable along a predetermined path adjacent the row of plants. A pair of rotors are moved along opposite sides of each plant. Each rotor contains at least one finger-like elongated, resilient defoliating member fixedly secured at one end only to the rotor and extending therefrom with the other end being unsupported and held in cantilever fashion such that the finger-like member may flex and move independently of the rotor as it engages leaves on plants during the defoliating operation.

SUMMARY OF THE INVENTION

One object of the present invention is to provide a mechanical pruning device for removing unwanted lower leaves from tobacco plants thereby increasing the propensity of the plant to produce additional valuable top leaves resulting in increased crop yield per acre.

An additional object of the present invention is to provide a mechanical pruning device whereby the unwanted tobacco leaves are removed by contact with rotating paddles which are drawn along opposite sides of each tobacco plant.

Another object of the present invention is to provide a mechanical pruning device wherein pairs of rotating paddles are mounted on an elongated tool bar. The tool bar extends laterally from a tow vehicle during the pruning operation and can be pivoted to a position in longitudinal alignment with the tow vehicle for transportation from one location to another.

An even still further object of the present invention is to provide a mechanical pruning device wherein the height of the tool bar can be adjusted by the use of gauge wheels in order to adjust the position of the rotating paddle in relation to the base of the tobacco plants to be pruned.

An even still further object of the present invention is to provide a mechanical pruning device wherein the tool bar can pivot about a horizontal axis to follow the contour of the terrain and thereby insuring accurate pruning of the tobacco plants.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figures 1, 5:
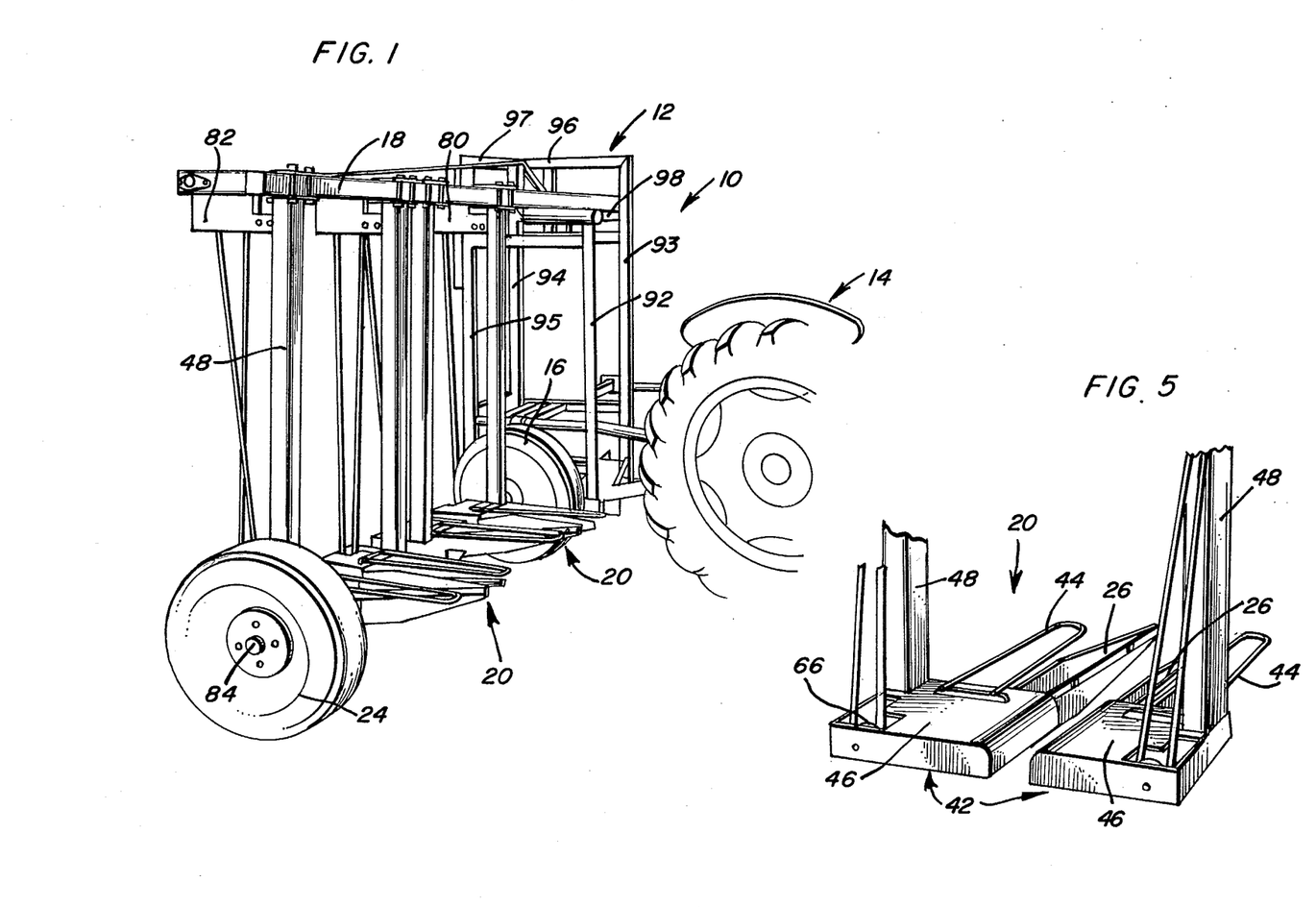
FIG. 1 is a perspective view of the pruning device of the present invention attached to the rear of a tractor.
FIG. 5 is a fragmental view showing one pruning head of the present invention.
Figure 2:
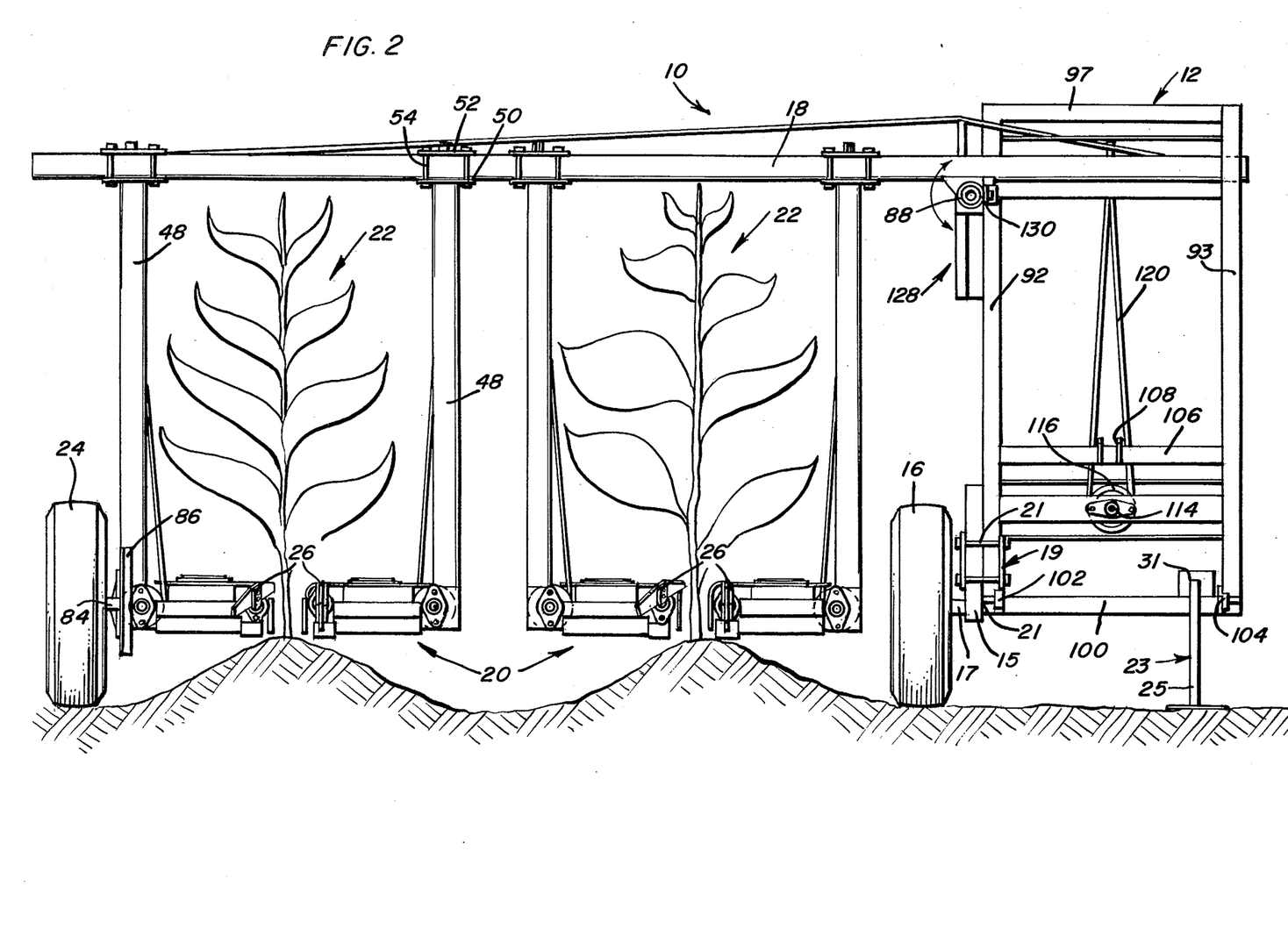
FIG. 2 is a front elevational view of the pruning device.
Figure 3:
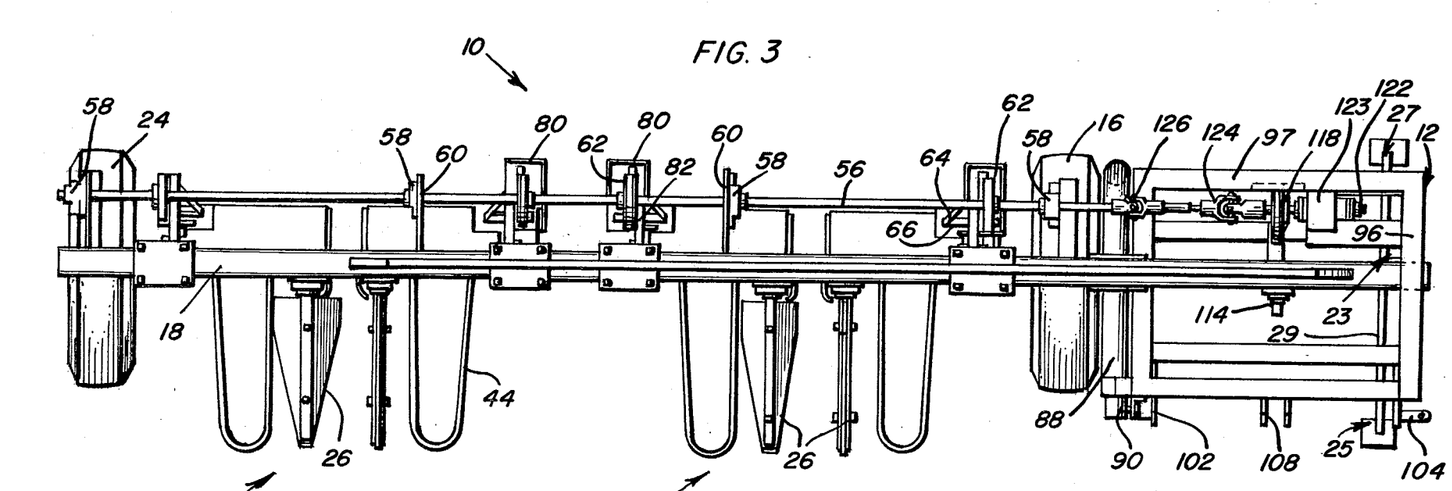
FIG. 3 is a top plan view of the pruning device.
Figure 4:
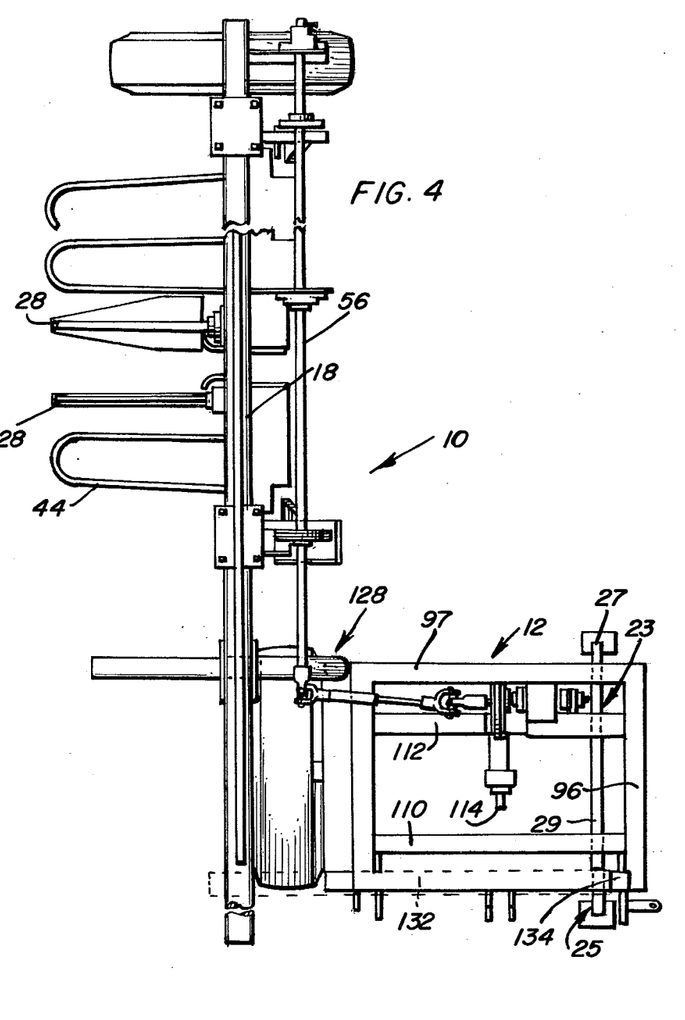
FIG. 4 is a top plan view of the pruning device with the tool bar extending rearwardly in position for being transported.

Now with reference to the drawings, a mechanical pruning device incorporating the principles and concepts of the present invention and generally referred to by the reference numeral 10 will be described in detail. With particular reference to FIGS. 1 through 3, it can be seen that the device comprises a main frame assembly 12 which mounts to the three point hitch of a tractor 14 or any other suitable tow vehicle. The main frame assembly is supported on a wheel 16 and is adjustable in height relative thereto for providing proper ground clearance for the working elements of the device. A tool bar 18 is mounted to the main frame assembly and extends therefrom laterally of the tow vehicle when in the operative position. The tool bar can also be swung rearwardly of the tow vehicle as shown in FIG. 4 for transportation between various work locations. The tool bar mounts a plurality of pruning heads 20 which depend therefrom to perform the actual defoliating procedure. Obviously, the tool bar 18 is mounted at a sufficient height to allow tobacco plants 22 shown in FIG. 2 to pass thereunder. The distal end of the tool bar is supported by a second wheel 24 which, in conjunction with wheel 16 controls the operating height of the pruning heads 20.

Figure 7:
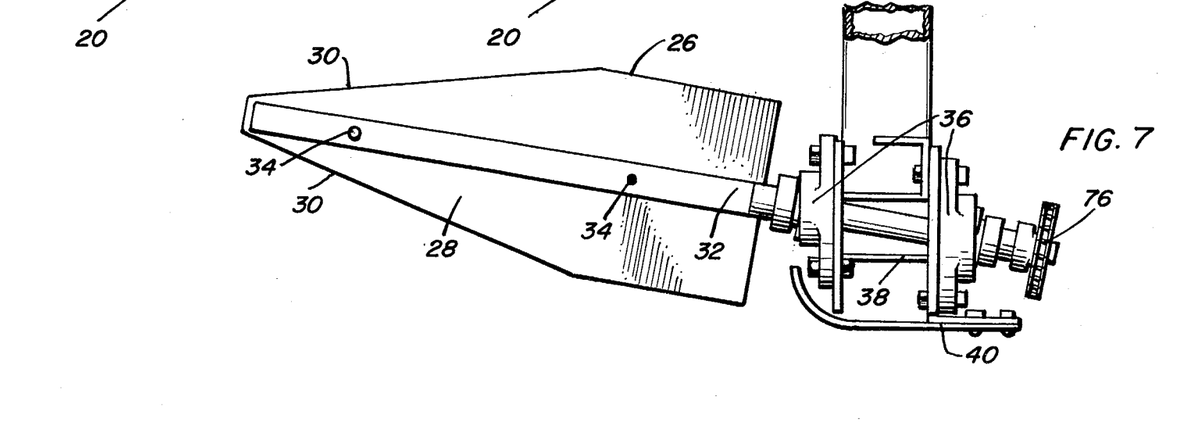
FIG. 7 is an enlarged fragmental view showing the positioning of one paddle of the present invention.

Each pruning head 20 comprises a pair of rotatable paddles 26, one of which is shown more clearly in FIG. 7. Each paddle 26 comprises a resilient paddle blade 28 formed from any standardly available rubber-like material. Each blade 28 is substantially planar in configuration with a generally rectangular rear portion and converging edges 30 forming the forward portion of the blade. Each blade is held within a slot formed in defoliator shaft 32 and affixed therein by the use of rivets 34 or the like which extend through the shaft and through the paddle 28. The defoliator shaft is inclined upwardly at an angle from 0° to 12° to the horizontal. This angle can be adjusted in order to vary the swath height and allow the heads to accommodate various maturities of tobacco plants. Each shaft 32 is supported and journalled in a pair of bearings 36 which are mounted on opposite sides of defoliator head frame member 38. The angle of inclination of the shaft 32 can be adjusted by changing the relative orientation of the two bearings 36 as would be obvious to one of ordinary skill in the art. A skid 40 is mounted to the lower portion of head frame member 38 in order that the tool head will not be damaged upon inadvertent contact with the ground as the pruning operation is performed. As shown in FIG. 5, each tool head 20 contains a pair of head members 42 which are symmetrical in configuration. Each head member includes a paddle and a shaft assembly as discussed in relation to FIG. 7. In addition to the paddles 26 which extend forwardly from the head members 42, a pair of wire leaf supporters 44 also extend forwardly alongside the paddles 26 for supporting larger upper leaves to keep these from contacting the paddles and being damaged by such contact. The supporters 44 are bolted to the top of head housings 46 which cover the head frame members 38 shown in FIG. 7. The tool head members themselves are mounted to depending support members 48 which slidably attach to the tool bar 18 as set forth in FIG. 2. Each support member 48 is attached to the tool bar by a sliding connection comprising a first plate 50 welded to the top of the support member and a second plate 52 which rests on top of the tool bar. A plurality of bolts 54 extend between the plates and can be loosened to allow the support members 48 to slide along the tool bar thereby adjusting the heads to accommodate the row spacings of the tobacco plants. Row spacings are normally between 44 inches and 60 inches and thus this amount of adjustment should be afforded by the invention.

Figure 6:
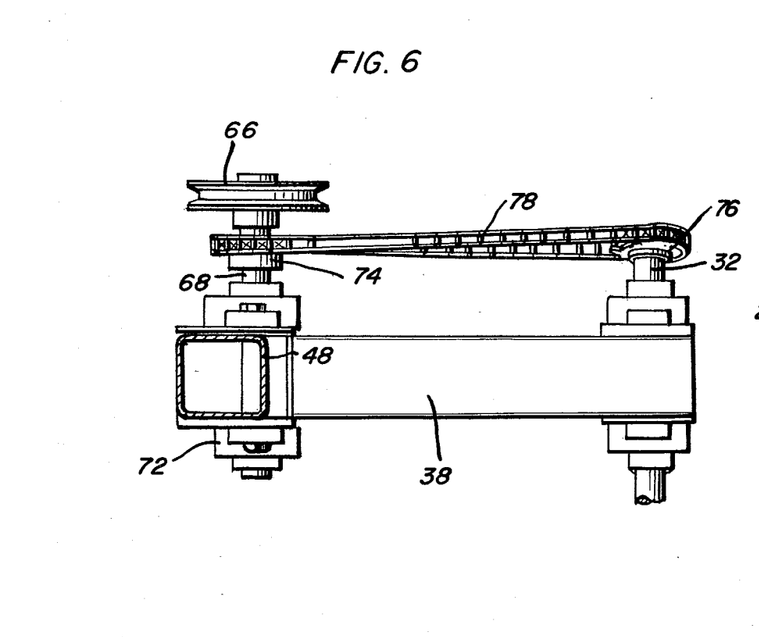
FIG. 6 is an enlarged view showing the chain drive mechanism for one paddle.

The drive system for each of the paddles 26 includes a main drive shaft 56 which extends for the length of the tool bar. Shaft 56 is mounted and journalled in bearings 58 which are spaced along the tool bar and connected to mounting plates 60 which extend to the rear of the tool bar. A plurality of pulleys 62 are mounted on shaft 56 in spaced relation to each other. Each pulley 62 is associated with a paddle 26 and is operatively engaged with the associated paddle through a drive mechanism including belts 64 which engage pulleys 66 which are mounted on intermediate shafts 68, one of which is shown more clearly in FIG. 6. The belts 64 undergo a 90° twist from pulleys 62 to pulleys 66 thereby enabling intermediate shafts 68 to lie in a plane parallel to defoliator shafts 32. The intermediate shafts 68 are mounted to the associated support member by bearings 72. Sprockets 74 and 76 are mounted on shafts 68 and 32 respectfully with the chain 78 extending between the sprockets. Each chain 78 is twisted slightly to accommodate the upward incline of shaft 32 as discussed hereinabove. It will be noted that by the use of intermediate shaft 68, the final gear ratio of the drive for each paddle can be adjusted by appropriate selection of sprockets 74 and 76. Further, since the shafts 68 and 32 lie in parallel planes, the inclination of shaft 32 can be adjusted without fear of chain 78 being loosened causing it to fall off during operation. It will also be noted that each pulley 66 is recessed within the associated housing 46 so that the housing acts as a guard against inadvertent contact of people or objects with the rotating pulley. In like manner, a guard element comprising a housing 80 shown more clearly in FIG. 3 is provided around each of the pulleys 62 to guard against contact therewith. Each housing 80 is affixed to a mounting plate 82 which in turn is attached to an associated support member 48. The housings 80 also serve as a means of aligning pulleys 62 and 66 when adjustment of the position of head members 42 is made since the housings 80 are moved with the head members.

As mentioned above, the distal end of tool bar 18 is supported by wheel 24. Wheel 24 is mounted upon axle 84 which in turn is attached to a support plate 86. Support plate 86 is slidably attached to the upright support member 48 furthest from the main frame assembly 12. Support plate 86 is slidably mounted to the associated member 48 so that wheel 24 can be adjusted in height in relation to the pruning heads 20. In this manner, the wheel 24 acts as a gauge wheel for adjusting the height of the pruning heads. The adjustable connection of plate 86 can be made by the use of threaded connectors or any other suitable attachment device.

The inner portion of the tool bar 18 is fixedly mounted to a pivot tube 88 in a position spaced from the absolute inner end of the tool bar by a distance equal to the width of the main frame assembly 12. The pivot tube 88 is mounted on a pivot shaft 90 thus allowing the tool bar 18 to pivot about the horizontal axis defined by the pivot shaft. In this manner, the gauge wheel 24 can follow the contour of the terrain accurately since the tool bar is able to pivot thus providing for freedom of motion in a vertical direction. This movement is constrained to defined limits by the disposition of the inner free end of the tool bar within a rectangular framework which is located on the right-hand side of the main frame assembly 12 and limits the vertical movement of the inner free end of the tool bar.

The main frame assembly 12 comprises four upright frame members 92, 93, 94 and 95 shown in FIG. 1. The top ends of frame members 93 and 94 are connected by a lateral frame member 96 while frame members 94 and 95 are connected by a similar frame member 97. Disposed below member 96 and also between the uprights 93 and 94 is an additional frame member 98. The space between members 98 and 96 defines the area in which the inner free end of tool bar 18 is disposed. The distance between members 96 and 98 defines the limit of free motion allowed to the tool bar 18. The bottoms of each of the uprights are also connected by frame members as, for instance, shown in FIG. 2 at 100. On the ends of member 100, there are two mounts 102 and 104 which connect with the lower arms of the three point hitch tractor 14. An additional cross member 106 contains mount 108 which connects to the upper arm of the tractor three point hitch. Additional cross members 110 and 112 are contained within the main frame for mounting the drive mechanism connecting the power take off of tractor 14 with drive shaft 56. These elements include a drive line 114 which attaches to the telescoping drive line from the power take off. Drive line 114 mounts a drive pulley 116 which operatively engages pulley 118 through belt 120. Pulley 118 is mounted on a shaft 122 which is supported and journalled in bearing 123. Shaft 122 is connected through universal joints 124 and 126 to the drive shaft 56. Accordingly, by connecting mounts 102, 104 and 108 to the three point hitch of the tractor and by attaching the telescopic drive line from the tractor power take off to drive line 114 of the pruning device, the device is rendered fully operational.

The height of the main frame assembly is controlled by adjustment of wheel 16 which is mounted in supporting relation thereto. The mounting structure for wheel 16 includes a wheel mounting plate 15 which is set forth in FIG. 2. Axle 17 is fixed thereto and extends laterally therefrom for supporting the wheel 16. The plate 15 is slidably mounted to the frame uprights, one of which is shown in FIG. 2 at 92, by the use of mounting bracket 19. Adjustment of the wheel position is effected by loosening bolts 21 of the mounting bracket and sliding plate 15 up or down along the frame uprights.

Also attached to the main frame assembly 12 is a stand 23 shown in FIGS. 2, 3 and 4. Stand 23 is contained at the lower left-hand side of the main frame opposite wheel 16 for supporting that portion of the frame when it is not attached to a tow vehicle. The stand comprises a pair of legs 25 and 27 which extend radially from shaft 29. Shaft 29 is rotatably mounted to the frame by use of mounting plates, one of which is shown at 31 in FIG. 2. Accordingly, legs 25 and 27 can be moved from a depending position supporting the frame as shown in FIGS. 2, 3 and 4 to a storage position extending laterally of the frame. Any convenient locking arrangement can be used to hold the stand in the two positions.

It will also be noted from inspection of FIGS. 3 and 4 that the tool bar 18 and attachments thereto can be pivoted rearwardly so as to be carried along behind the two vehicle for transportation from one work location to another. This pivoting movement is accomplished by forming the pivot shaft 90 as a right angle member with one leg thereof being disposed vertically in a vertical pivot tube 128 shown also in FIG. 2. To move the tool bar from the lateral position to the rear position, all that one needs do is remove nut and bolt 130 shown in FIG. 2 holding the front end of the pivot shaft 90 against the main frame assembly 12. Once the front end of the pivot shaft is freed, the tool bar is simply moved through an arc rearwardly of the main frame assembly to the position shown in FIG. 4. The inner end of the tool bar swings through an arc and is removed from contact with the main frame assembly. Once disposed in the carrying position of FIG. 4, it may be necessary to constrain the forward end of the tool bar by attaching a restraining element shown in phantom at 132 to the cross member 134 of the main frame assembly. The restraining element serves to hold the forward end of the tool bar down when the entire device is raised by the three point hitch of the tractor for transportation.

In other environments, the tool bar with attached pruning heads can be used directly. The tool bar could be attached to a sprayer having auxiliary hydraulics. In this case, an additional gauge wheel would be attached to the innermost support member 48 for supporting the entire tool bar assembly. The tool bar would be mounted directly to the sprayer's tool bar hitch and the drive shaft 56 would then be driven via a hydraulic motor mounted on the end of the shaft powered by the hydraulic system of the sprayer.

Figures 8, 10:
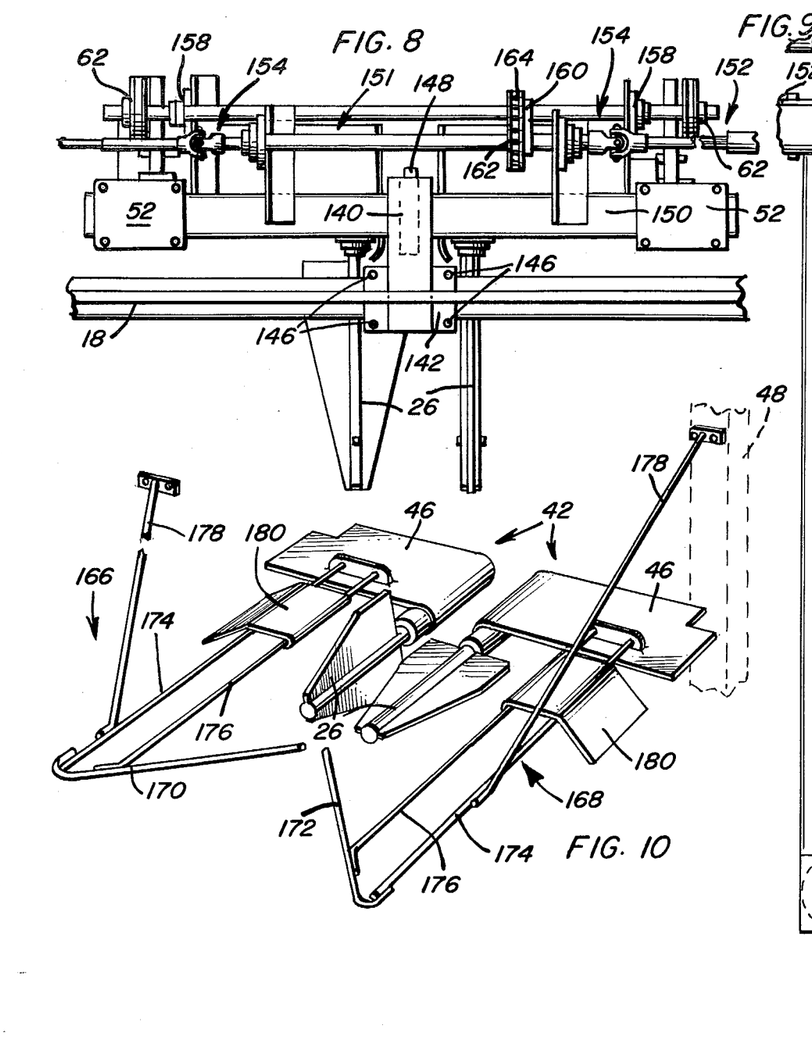
FIG. 8 is a fragmental top plan view showing an alternate swivel mount for the pruning heads.
FIG. 10 is a perspective view showing the guides used on the head members for controlling the tool head swivel mounts.
Figure 9:
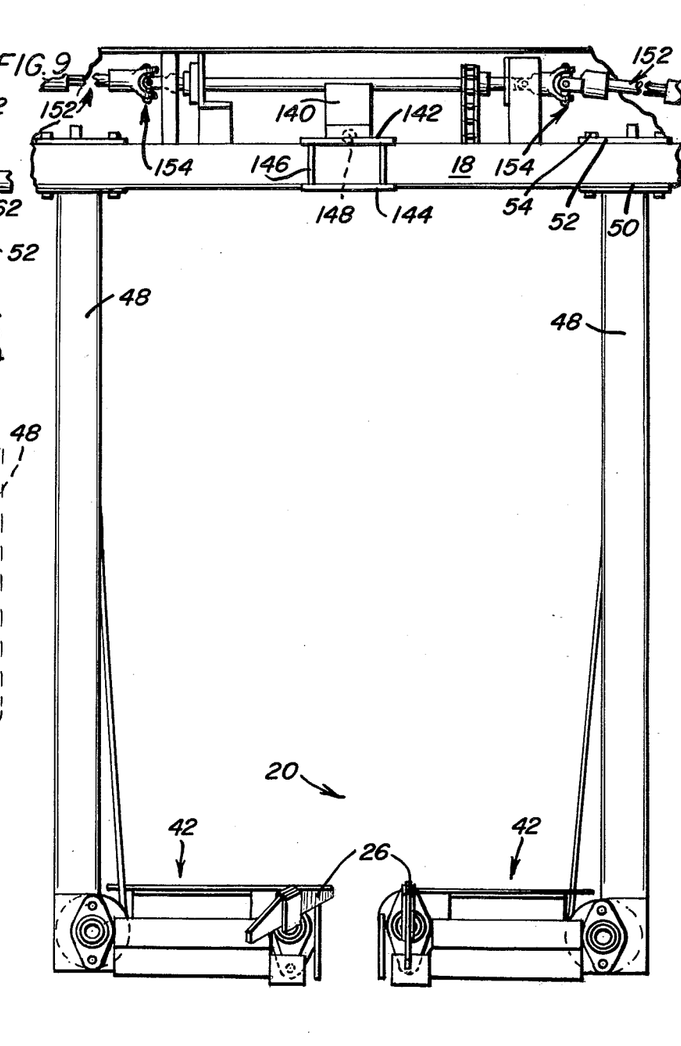
FIG. 9 is a fragmental elevational view showing the swivel mount.

With reference to FIGS. 8, 9 and 10, an alternative structure for mounting the pruning heads 20 will be described. The purpose of the alternative mounting structure is to allow each pruning head to swivel individually on the tool bar 18 so that proper alignment between each pruning head and the tobacco stalk to be pruned will be had. Each swivel mounting is effected by the use of a rearwardly extending swivel arm 140 mounted to the upper plate 142 of the clamping mechanism comprising plates 142, 144 and the four bolts 146. The swivel arm 140 has a pivot pin 148 fitted therein which slides through an appropriate boss in pruning head support tool bar 150. The pivot point of bar 150 is located at the longitudinal center of that bar. The bar 150 can thus swivel about the pin 148 with a minimum of force supplied thereto. The upright support members 48 of the pruning head 20 are mounted on opposite ends of the bar 150 by use of the clamping structures comprising plates 50, 52 and bolts 54 with the pruning head members 42 being attached thereto as described hereinabove.

The drive mechanism for the blades 26 also must be modified to accommodate the swivel motion. The main drive shaft 15 is divided into sections which are mounted to each support tool bar and interconnected by splines 152 and universal joints 154 so that each pruning head unit can swivel individually with any increase or decrease in length of the drive shaft sections being accommodated by the splines and any change in orientation being accommodated by the universal joints. A secondary drive shaft shown at 156 is mounted between support members 48 by the use of bearings 158. At each end of the shaft 156, there is mounted a pulley 62 of belt and pulley drive discussed hereinabove for driving the paddles 26. The secondary drive shaft 156 is connected to the main drive shaft by the use of sprockets 160 and 162 and chain 164. Sprocket 160 is mounted on the secondary drive shaft while sprocket 162 is mounted on the main drive shaft.

Obviously, it can be seen that each pruning head 20 is capable of swiveling about pin 148 through an arc to allow for misalignment of plants in a particular row or to compensate for driver error in alignment while defoliating a row or rows of plants. The pruning heads can swivel individually when mounted by the swivel structure described above in order that misalignment of plants in adjacent rows can be compensated for adequately by the invention.

In order to insure that a plant is drawn between the paddles 26 of a pruning head, a pair of guide members 166 and 168 are attached to the pruning head members 42. These guides are shown in FIG. 10 and replace the leaf supporters 44 on the original structure. The guides essentially comprise a pair of inwardly converging guide elements 170 and 172 which direct a stalk of a tobacco plant between the paddles 26 to effect the defoliating process. These elements 170 and 172 can be stiff bar members as shown, plates or any other suitable elements used to direct the stalk of the plant in the appropriate direction. Clearly, when a tobacco stalk hits one of the members 170, 172, the entire pruning head structure will pivot on the associated pin 148 to provide appropriate alignment with the paddles 26. Members 170, 172 are each supported by a pair of forwardly directed elements 174 and 176 which are fixedly attached to the top of head housings 46. Also, braces 178 are connected between support elements 174 and the associated upright support member 48 in order to provide horizontal stability to the guides. Further, angled plates 180 are mounted to the elements 714 and 176 and extend laterally therefrom in order to support upper leaves on the tobacco plant and keep those from engaging the paddles 26.

It is evident that the embodiment of the mounting structure shown in FIGS. 8-10 provides greater versatility to the invention by enabling the pruning heads to take on independent and various orientations with respect to the two vehicle to accommodate for misalignment of particular plants in a row or alignment errors of the driver of the tow vehicle. Of course, this structure would be used optionally on the invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follow:

1. An apparatus for defoliating a defined vertical section of a plurality of plants disposed in at least one row, said apparatus comprising in combination: an elongated tool bar mounting a plurality of pruning heads, each pruning head comprising a pair of rotatable paddles laterally spaced by a distance sufficient to accept the stalk of a plant to be defoliated therebetween; support means for supporting said tool bar at a height sufficient to pass over a plant to be defoliated; power drive means for rotating said paddles, said power drive means including a drive shaft mounted to said tool bar, a plurality of drive trains drivingly connecting each of said paddles to said drive shaft, each of said paddles comprising a resilient blade, each of said blades being mounted on a paddle shaft, each of said paddle shafts being disposed at an upwardly inclined angle, said inclined angle being adjustable to control the pruning swath of said paddle, each of said blades being generally planar in configuration with forwardly converging edges forming a generally triangular forward blade portion, each of said pruning heads including a pair of leaf support arms, one of said arms extending codirectionally adjacent each of said paddles for deflecting drooping leaves out of the way of said paddles, each of said drive trains including an intermediate shaft disposed in a parallel plane to each of said paddle shafts, and a chain and sprocket drive connected between each intermediate shaft and each paddle shaft, the chain of said chain and sprocket drive undergoing a longitudinal twist to compensate for the inclined angle of said paddle shaft.

2. The invention as defined in claim 1 wherein each of said drive trains further includes a first pulley mounted to said drive shaft and a second pulley mounted to each of said intermediate shafts with a belt extending between said first and second pulleys.

3. The invention as defined in claim 1 wherein said support means includes a tool bar having an inner end and a distal end, and a first support wheel mounted in supporting relation to said distal end.

4. The invention as defined in claim 3 and further including a main frame assembly, said inner end being attached to said main frame assembly, said main frame assembly including three mounting points for attachment to a three point hitch of a tow vehicle.

5. The invention as defined in claim 4 wherein said inner end is attached to said main frame assembly by a pivot means for allowing said tool bar to move between a position extending laterally of said main frame assembly for performing work operations and a position disposed rearwardly of said main frame assembly for transportation from one location to another.

6. The invention as defined in claim 4 wherein said tool bar is hingedly attached to said main frame assembly for movement about a horizontal axis for allowing said tool bar to follow terrain contour.

7. The invention as defined in claim 6 wherein said tool bar is further attached to said main frame assembly by a vertical pivot axis for allowing the tool bar to be moved between a first position extending laterally of said main frame assembly and a second position extending rearwardly of said main frame assembly.

8. The invention as defined in claim 6 and further including vertical movement limiting means for constraining vertical movement about said horizontal axis.

9. The invention as defined in claim 8 wherein each of said paddles includes a resilient blade member, each of said blade members being mounted on a paddle shaft, each of said paddle shafts being inclined upwardly.

10. The invention as defined in claim 1 wherein each of said pruning heads is adjustably mounted to said support means for an adjustment longitudinally thereof.

11. A pruning apparatus according to claim 1 for removing unwanted lower leaves from the stalk of a tobacco plant, said pruning apparatus comprising in combination:
a main frame assembly including three mounting points for attachment to the three point hitch of a tow vehicle;
said tool bar connected to said main frame assembly;
first hinge means for allowing said tool bar to pivot about a horizontal axis; and
second hinge means for allowing said tool bar to pivot about a vertical axis for movement between a first position extending laterally of said main frame assembly and a second position extending rearwardly of said main frame assembly.

12. The invention as defined in claims 1 wherein each pruning head is pivotally mounted to said tool bar to allow individual pivotal motion to compensate for plant misalignment.

13. The invention as defined in claim 1 and further wherein each pruning head includes a guide means for guiding a plant stalk between the associated paddles.

14. The invention as defined in claim 13 wherein each guide means includes a pair of converging guide elements.

15. The invention as defined in claim 12 wherein said tool bar includes a main tool bar; and a support tool bar associated with each pruning head, said each pruning head having its pivotal mounting being contained between each support tool bar and said main tool bar.

16. A pruning apparatus for removing unwanted lower leaves from the stalk of a tobacco plant, said pruning apparatus comprising in combination: a main frame assembly including three mounting points for attachment to the three point hitch of a tow vehicle; a tool bar connected to said main frame assembly; first hinge means for allowing said tool bar to pivot about a horizontal axis; second hinge means for allowing said tool bar to pivot about a vertical axis for movement between a first position extending laterally of said main frame assembly and a second position extending rearwardly of said main frame assembly; a drive shaft extending along side said tool bar; at least one pruning head attached to said tool bar, said pruning head including a pair of rotatable paddles drivingly connected to said drive shaft; each pruning head being pivotally mounted to said tool bar to allow individual pivotal motion to compensate for plant misalignment; said tool bar including a main tool bar; and a support tool bar associated with each pruning head, said each pruning head having the pivotal mounting being contained between each support tool bar and said main tool bar, said drive shaft including one drive shaft section associated with and mounted to each support tool bar, said drive shaft sections being connected by at least one universal joint and one sliding spline.

17. The invention as defined in claim 16 wherein each of said paddles have blades generally planar in configuration with converging forward edges.

* * * * *